Jan. 28, 1958  C. G. GIBBONS ET AL  2,821,314
TURNOVER MECHANISMS FOR DEPANNING MACHINES
Filed July 18, 1955  2 Sheets-Sheet 1

INVENTORS
CHARLES G. GIBBONS.
FRANK N. SIMS.
BY
*Fearman & Fearman*
ATTORNEYS

Jan. 28, 1958  C. G. GIBBONS ET AL  2,821,314
TURNOVER MECHANISMS FOR DEPANNING MACHINES
Filed July 18, 1955  2 Sheets-Sheet 2

INVENTORS
CHARLES G. GIBBONS
FRANK N. SIMS
BY
Learman & Learman
ATTORNEYS

2,821,314

TURNOVER MECHANISMS FOR DEPANNING MACHINES

Charles G. Gibbons and Frank N. Sims, Saginaw, Mich., assignors to Baker Perkins, Inc., Saginaw, Mich.

Application July 18, 1955, Serial No. 522,686

10 Claims. (Cl. 214—311)

This invention relates to bread handling apparatus and more particularly to turnover mechanisms for depanning machines and other bakery equipment. I have particular reference to a bread depanner of the type shown in Patent No. 2,673,652, issued March 30, 1954, to R. P. Steadman wherein the bread loaves are discharged to a conveyor in inverted position and must then be reversed and transferred to a transversely moving conveyor.

Frequently, one or more of the loaves in a pan set which has been subjected to depanning action will tend to hang in its pan a little longer than the other loaves before dropping to a delivering conveyor, and instead of being disposed in abreast relation on the conveyor, the loaves will be in staggered relation when released to the turnover slide. The result is that all of the loaves will not be delivered simultaneously to the outgoing, transversely traveling conveyor and will not ultimately be uniformly spaced thereon as a consequence. Since the baking and packaging of bread is becoming more and more an automatic operation, manufacturers of bakery equipment find it important to be certain that the products leaving a given piece of equipment or machine by conveyor are uniformly spaced so that subsequent automatic operations can be performed on them.

Accordingly, one of the prime objects of the instant invention is to design a turnover mechanism which delivers the loaves to the outgoing conveyor in abreast relation so that they will be uniformly spaced apart as they travel on the outgoing conveyor. Such a mechanism obviously not only spaces the loaves evenly to facilitate subsequent slicing and packaging operations, but also prevents any jamming of the loaves on the outgoing conveyor and damage which might be caused thereby.

Briefly, the invention comprises a revolvable tray having cam controlled, releasable end walls which alternately are in a position to receive and release the bread to a slide during revolution of the tray. The releasable wall which at a particular instant is in position to receive the loaves, functions as a stop to hold them until any trailing loaves have moved into abreast relation with the loaves held, whence the tray is revolved through half a revolution to turn the loaves over and the wall is lowered to release them. Because a releasable wall or gate which is automatically returned to position after releasing the loaves is provided on both the front and rear ends of the tray, the latter may be loaded twice during the course of a revolution.

Another object of the invention is to provide turnover mechanism which supports the loaves in parallel, abreast relation throughout the majority of the time they are being turned and finally releases them in almost the position they are to proceed down the slide, thus preventing relative skewing and mispositioning of the loaves during the turnover operation.

A further object of the invention is to provide turnover means of the type described which completes a full revolution and loses no time in a non-working return stroke, the instant tray being capable, as mentioned, of receiving and turning two sets of loaves during the course of a single revolution.

Another object of the invention is to design turnover means which is fully automatic in character and will supply succeeding sets of loaves to the outgoing conveyor in uniformly spaced relation.

A further object of the invention is to provide turnover means which is simple in design, highly efficient and sanitary in operation since the loaves need not be touched by human hands, and which can be very economically fabricated and assembled on depanning apparatus or the like.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

Figure 1:
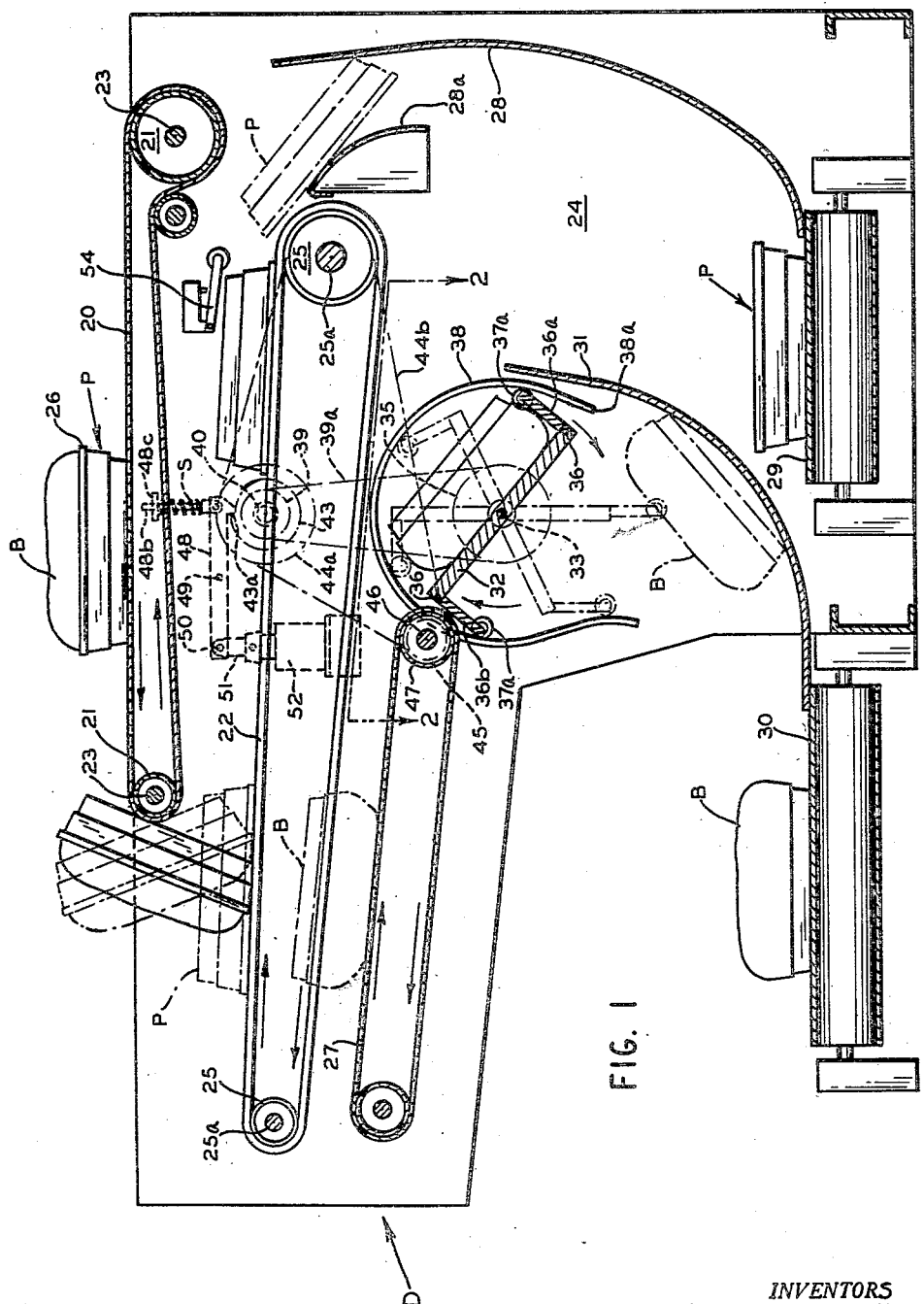
Fig. 1 is a sectional, elevation view of the essential elements of the depanning machine shown in the patent referred to with our novel and improved turnover mechanism incorporated therein, the broken lines indicating advanced positions of the turnover platform or tray as well as various positions of the loaves and pans.
Figure 2:
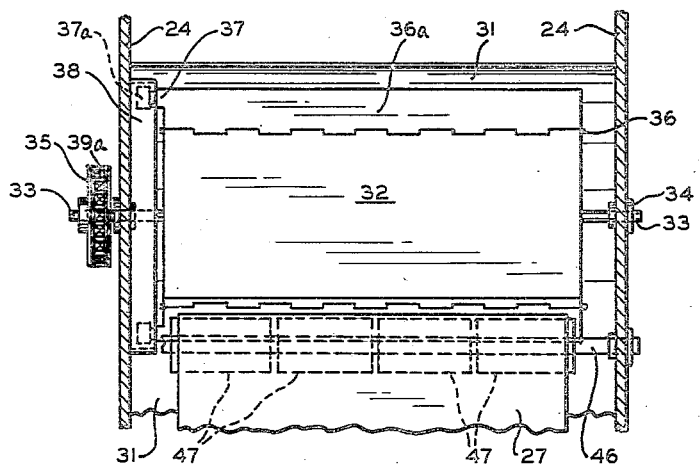
Fig. 2 is a top plan view taken on the line 2—2 of Fig. 1.
Figure 5:
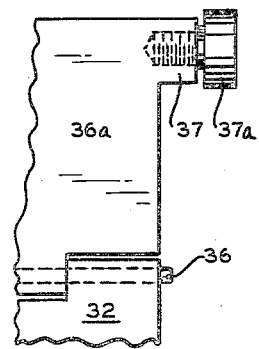
Fig. 5 is an enlarged fragmentary view showing a platform gate in swung down position.
Figure 4:
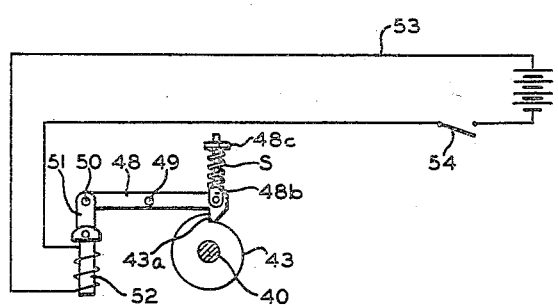
Fig. 4 is a circuit diagram schematically depicting the means controlling the operation of the turnover platform.
Figure 3:
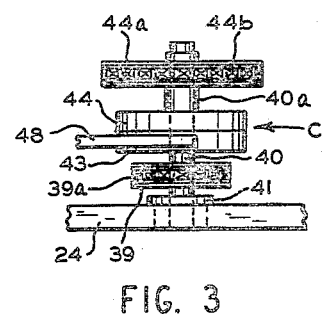
Fig. 3 is a fragmentary top plan view illustrating mechanism for revolving the turnover platform.
Figure 6:
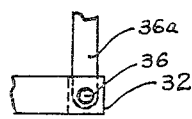
Fig. 6 is a fragmentary elevational view illustrating the manner in which the platform prevents its gates from swinging inwardly beyond a substantially vertical position.

Referring now more particularly to the accompanying drawings wherein I have shown a preferred embodiment of the invention, a letter D generally indicates the previously mentioned Steadman depanning machine which now incorporates the novel turnover mechanism of the instant invention. As disclosed in the patent referred to, the depanner D includes an upper conveyor 20, trained around pulleys 21, which operates to deliver the pan sets P to a pair of spaced apart V belts 22 underneath the conveyor 20. The depanning apparatus will preferably be located adjacent an oven so that oven unloading elements can transfer pansets P containing baked bread loaves B directly to the conveyor 20 which is shown proceeding counterclockwisely in Fig. 1. The pulleys 21 are mounted on shafts 23 which extend between the side walls 24 of the machine and similarly supported on shafts 25a are pulleys 25 over which the belts 22 are trained. The belts 22 extend a considerable distance rearwardly of the conveyor 20, and are spaced from the upper run of the conveyor 20 a distance which is preferably less than the length of the pans so that the leading ends of the pansets will tip to the belts 22 and the pansets will be flipped over by the clockwisely traveling belts 22 (see the diagrammatic representations of the pansets in Fig. 1). When the portion of the pan strap 26 on the end of a panset which has been flipped over strikes the belts 22, the bread loaves B are jarred loose and fall through to a belt conveyor 27 which is traveling clockwisely in the same direction as the belts 22. Disposed in front of the belts 22 to receive the emptied pan sets is a slide or chute 28 including a guide 28a, which delivers the pansets to a transversely moving conveyor 29.

As previously noted, it is highly desirable to facilitate subsequent automatic processing, that the bread loaves B be delivered to a transversely moving conveyor 30 in right side up, uniformly spaced relation. Mounted between the arcuate slide or chute 31 and the front end of the conveyor 27, is a revolvable turnover platform or tray 32 fixed on a shaft 33 which extends laterally beyond both sides of the platform 32. The ends of the shaft 33 are journaled in bearings 34 on the walls 24 and mounted on one end of the shaft 33 is a drive sprocket 35 which will be intermittently driven in a manner to be later described.

Pivotally mounted or hinged as at 36 to the ends of the platform 32 are end walls or flaps 36a and 36b, and mounted on extensions 37 which extend laterally or transversely from the walls 36a and 36b are rollers 37a which are adapted to ride on the interior wall of a cam track 38 which is supported on the one wall side 24. Plainly, if desired, cam tracks 38 could be supported on both side walls 14 and rollers could be provided on both sides of platform 32.

The sprocket 35 on the turnover platform shaft 33 is driven by means of a chain 39a from a sprocket 39 on a shaft 40 which is journaled in a bearing 41 on the one wall 24 above the shaft 33. Releasably coupling the shaft 40 with a sleeve 40a thereon is a Hilliard clutch C (Patent No. 2,140,737) which includes a driven clutch member 43 on the shaft 40 in engagement with a driving clutch member 44 on the sleeve 40a. The sleeve 40a which may be rotatably retained on the shaft 40 in any suitable manner has a sprocket 44a thereon around which a chain 44b is trained, the chain 44b being also trained around a pulley 45 on the shaft 46 which supports the front pulley 47 of the conveyor 27. The pulleys 47 are driven in the same manner as in the Steadman patent referred to as are also the other elements 20, 22, 29, and 30, and accordingly the driving mechanism, which connects to a suitable motor as usual, will not be shown.

The one toothed ratchet wheel 43 of the clutch is restrained from continuous revolution with the outer end of the shaft 40 and driving element 44 of the clutch by a pawl or detent 48 which is intermediately pivoted as at 49. The clutch elements 43 and 44 are disengaged when the detent 48 blocks further rotation of wheel 43 (see the Hilliard patent referred to), but are immediately reengaged when the detent is raised. The rear end of the detent 48 is pivoted as at 50 to the armature rod 51 of a solenoid 52. When the solenoid 52 is momentarily energized, the rod 51 is pulled downwardly and the front end of the detent lever 48 is lifted so that the wheel 43 is free to move through a single revolution with the element 44. The tooth 43a will, of course, be reengaged and held by the shoulder 48a on the lever 48 after one revolution, the compression spring S mounted on rod 48b which is slidable on bracket 48c on the wall 14 returning the detent 48 as should be apparent. The solenoid 52 is energized through a circuit 53 by a normally open microswitch 54 which is disposed in the path of the pans P on the pan disposal conveyor 29 so that it will be tripped by each panset proceeding to the chute 28.

In operation when a panset drops off the rear end of the conveyor 20 and flips over, and its fall is then abruptly arrested, at least two or three of the loaves in the panset will be simultaneously released to the conveyor 27. One or more of the loaves may hesitate momentarily in one of the pans however, and thus the loaves proceeding forwardly on the conveyor 27 may be staggered from front to rear instead of in abreast relation. If the loaves simply pass from the conveyor 27 to the slide 31 and the transversely moving conveyor 30, they will not be uniformly spaced on the conveyor 30 and if one or more of the loaves lags the others considerably, there may be a jam up on the conveyor 30. In the instant machine the loaves pass from the conveyor 27 to a turnover platform 32 which has a hinged front stop wall 36a. The microswitch 54 is disposed sufficiently forwardly of the terminal end of the conveyor 27 that it is not tripped by the panset proceeding forwardly on the conveyor belts 22 until any lagging loaves have had an opportunity to move into engagement with the front wall 36a abreast of the other loaves. Note that the conveyor 27 inclines downwardly and that the turnover platform 32 when in rest position (as indicated by the solid lines in Fig. 1), is tilted downwardly at a slightly greater angle so that the loaves will move immediately into engagement with the wall 36a. When the microswitch 54 is tripped, the lever 48 lifts and the wheel 43 makes one revolution. The shaft 33 which is provided with a sprocket 35 twice the diameter of sprocket 39 moves through half a revolution and after the loaves are released the tray 32 is ready to be loaded again.

The front end of the cam track 38 terminates as shown at a point 38a considerably below a horizontal plane through the axis of the shaft 33. When the gate or wall 36a at the front of the platform clears the edge 38a, the gate which by then forms a slightly obtuse angle with the tray because the track tends to flatten slightly at its lower end rather than to describe a true arc, drops over and the loaves are simultaneously released to the slide 31. At the time this occurs, the platform 32 is substantially vertical and adjacent the slideway 31 so that the loaves slide smoothly and evenly to the conveyor 30. The loaves will never tend to be displaced or skew so that they do not feed to the conveyor 30 at right angles as sometimes occurs when the conveyor 27 feeds directly to a slideway.

As the tray continues to revolve, the gate 36a comes into engagement with the depending, substantially vertical rear end of the camtrack 38 and is gradually restored to its former position at right angles to the platform 32. After half a revolution of the platform is completed and it comes to rest, the end of the platform which was formerly the rear end is now the front end and its hinged wall or gate 36b is in position to receive the succeeding set of inverted loaves B. When the switch 54 is momentarily closed by the succeeding panset the cycle again repeats.

It should be apparent that we have perfected very practical and efficient turnover mechanism which will be useful in a multitude of unloading operations or the like although it is particularly suited to employment in depanning machines of the type which we describe. It is to be understood that the terminology employed in the claims is to be given the broadest possible interpretation in view of the art since we are aware that various equivalent changes may be made to achieve the same results without departing from the spirit of the invention or the scope of the appended claims. In all cases the descriptive text and drawings are to be interpreted as merely illustrating principles of the invention and not as in any way limiting the scope thereof.

We claim:

1. Turnover apparatus for location between a delivery means and a receiving slideway comprising, a platform having oppositely extending, hinged end walls adjacent said means and slideway, means for revolving the platform in a direction whereby the end walls extend oppositely from the direction of revolution, and means releasing said end walls during revolution of the platform when the articles thereon are adjacent said slideway and later restoring said end walls to position.

2. The combination defined in claim 1 in which said latter means comprises at least one arcuate camtrack, said end walls having laterally projecting followers thereon riding on said track.

3. In combination, a revolvably supported turnover platform normally in a horizontally tilted position, means delivering articles in inverted position to said platform, a slideway adjacent said platform opposite said delivery means, means for intermittently revolving said platform one half a revolution at a time in a given direction, end walls for said platform, one on the one support surface of the platform and the other on the opposite surface of the platform, said end walls extending in a direction opposite to the direction of rotation of the ends of the platform and being hingedly connected thereto, an arcuate cam track laterally outwardly of said platform, and followers projecting laterally from said end walls riding on the interior surface of said track for controlling the end walls when the followers are in engagement with the track.

4. In combination, a conveyor adapted to transport sets of laterally spaced apart bread loaves in inverted position, a turnover platform in front of said conveyor for receiving said loaves therefrom, said platform being horizontally tilted downwardly from said conveyor, an upstanding wall hingedly mounted on the front edge of said platform and receiving said loaves, a wall hingedly mounted on the rear edge of said platform and depending therebelow, shaft means revolvably supporting said platform, a substantially cylindrical cam track with a diameter slightly in excess of the length of said located platform and with its axis substantially coincident with the shaft means located laterally outwardly of and substantially above said platform, laterally projecting follower rollers on said end walls riding on the inner wall of said track and maintaining said end walls projecting angularly from the platform so long as the rollers are in engagement with the track, and means revolving said platform sufficiently so that said front end wall drops from the track to a position parallel thereto and continuing to revolve said platform until half a revolution is completed.

5. The combination defined in claim 4 in which the terminal front edge of said track is flattened out slightly from its normal arc so that the said front wall will be inclined forwardly as the follower roller thereon leaves the track.

6. Bread depanning apparatus comprising means for emptying bread loaves from a bread pan set; means for conveying the bread loaves and the empty pan set away along separate paths; a slideway for receiving the bread loaves from their conveying means; stop means located between the slideway and the bread loaves conveying means and in the path of the bread loaves for preventing entry of the bread loaves into the slideway; and means located in the path of and operable by the empty pan set at a predetermined point in its travel on its conveying means to release said stop means and permit the bread loaves to enter the slideway.

7. The apparatus set forth in claim 6 in which the predetermined point of travel of the pan set is so located relatively to said stop means that there normally is a time lag between the arrival of the bread loaves at the stop means and the operation of the release means so as to enable misaligned bread loaves to align themselves abreast prior to entering the slideway.

8. Bread depanning apparatus comprising means for inverting a loaded pan set to separate the loaves from their pans; means for conveying the inverted loaves and the empty pan set away along separate paths; means for receiving the bread loaves from their conveying means in upright position; turnover means interposed between the bread loaves conveying means and the bread loaves receiving means for turning the bread loaves from inverted position to upright position, said turnover means including a stop part positioned in the path of the bread loaves for preventing delivery of the bread loaves to their receiving means; and means operable by the pan set at a predetermined point in its travel on its conveyer means to effect operation of said turnover means and release of said stop part so that the bread loaves may be received by said receiving means in upright position.

9. The apparatus set forth in claim 8 in which said pan set operable means is so located relatively to said turnover means that there normally is a time lag between the arrival of the bread loaves at the stop part and the operation of said pan set operable means so as to enable misaligned loaves to align themselves abreast prior to being turned upright.

10. Bread loaf turnover apparatus for receiving loaves of bread in inverted position from a delivery means and turning them over for discharge in upright position to receiving means, said turnover apparatus comprising a rotatable platform having a swingable wall at at least one end thereof normally extending in a direction to lie in the path of movement of bread loaves from the delivery means to the receiving means for interrupting movement of the loaves, said wall being swingable to a position as to permit movement of the loaves past the wall; means for rotating said platform in a direction opposite to the direction in which said wall extends; and means for guiding said wall during rotation of said platform so as to swing said wall out of the path of the loaves at a predetermined position of said platform and to restore said wall to a position in the path of subsequent bread loaves after the loaves on said platform have been discharged.

References Cited in the file of this patent

UNITED STATES PATENTS

| | | |
|---|---|---|
| 2,106,469 | Seil | Jan. 25, 1938 |
| 2,549,281 | Armstrong et al. | Apr. 17, 1951 |
| 2,633,258 | Temple et al. | Mar. 31, 1953 |
| 2,673,652 | Steadman | Mar. 30, 1954 |
| 2,709,013 | Hartzog | May 24, 1955 |